(12) United States Patent
Matsumoto et al.

(10) Patent No.: US 12,392,501 B2
(45) Date of Patent: Aug. 19, 2025

(54) HOT-WATER SUPPLY AND HEATING SYSTEM (71) Applicant: Mitsubishi Electric Corporation, Tokyo (JP)

(72) Inventors: Takenori Matsumoto, Tokyo (JP); Naoto Ishii, Tokyo (JP); Tsukine Matsugami, Tokyo (JP); Kimitaka Kadowaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 18/027,034

(22) PCT Filed: Dec. 7, 2020

(86) PCT No.: PCT/JP2020/045476
§ 371 (c)(1),
(2) Date: Mar. 17, 2023

(87) PCT Pub. No.: WO2022/123626
PCT Pub. Date: Jun. 16, 2022

(65) Prior Publication Data
US 2023/0375193 A1    Nov. 23, 2023

(51) Int. Cl.
*F24H 1/18* (2022.01)
*F24D 3/02* (2006.01)
(Continued)

(52) U.S. Cl.
CPC ...... *F24D 3/18* (2013.01); *F24D 3/08* (2013.01)

(58) Field of Classification Search
CPC ..... F24D 3/02; F24D 3/08; F24D 3/18; F24D 9/02; F24D 17/0057; F24H 1/12;
(Continued)

(56) References Cited

U.S. PATENT DOCUMENTS

| 5,839,655 A | 11/1998 | Iritani |
| 11,802,702 B2 * | 10/2023 | Kato ................ F24F 11/41 |

(Continued)

FOREIGN PATENT DOCUMENTS

| CN | 206609042 U | * 11/2017 |
| CN | 109059376 A | 12/2018 |

(Continued)

OTHER PUBLICATIONS

International Search Report of the International Searching Authority mailed Feb. 16, 2021 for the corresponding International Application No. PCT/JP2020/045476 (and English Translation).

*Primary Examiner* — Gregory A Wilson
(74) *Attorney, Agent, or Firm* — Posz Law Group, PLC (57) ABSTRACT A hot-water supply and heating system includes: a first pump that circulates a first heat medium between a heat source unit and a heat-medium heat exchanger; a second pump that causes a second heat medium to flow between a load-side device and the heat-medium heat exchanger; a first temperature sensor that detects a primary fluid temperature that is a temperature of the first heat medium that flows out of the heat source unit; a heat-source-unit controller; and a pump controller. The heat-source-unit controller transmits information indicating the heating capacity of the heat source unit reaches an upper limit value to the pump controller, when it is determined that the primary fluid temperature is lower than a target temperature and the heating capability of the heat source unit is equal to the upper limit value. The pump controller reduces an operation frequency of the second pump when receiving the above information.

4 Claims, 6 Drawing Sheets (51) Int. Cl.
*F24D 3/08* (2006.01)
*F24D 3/18* (2006.01)

(58) Field of Classification Search
CPC ... F24H 1/18; F24H 4/02; F28D 15/00; Y02B 30/70
See application file for complete search history.

(56) References Cited

U.S. PATENT DOCUMENTS

2009/0173336 A1* 7/2009 Leifer .................. F28D 20/021
165/104.11
2017/0234576 A1* 8/2017 Kawagoe .............. F24H 9/2007
62/203

FOREIGN PATENT DOCUMENTS

| | | | | |
|---|---|---|---|---|
| CN | 108800564 B | * | 11/2020 | ............... F24H 4/02 |
| EP | 3722697 A1 | | 10/2020 | |
| EP | 3722697 B1 | * | 8/2023 | .......... F24D 11/0214 |
| JP | S57-134536 U | | 8/1982 | |
| JP | S60-028342 U | | 2/1985 | |
| JP | H10-019283 A | | 1/1998 | |
| JP | 2005-201618 A | | 7/2005 | |
| JP | 2008-082653 A | | 4/2008 | |
| JP | 6400256 B1 | * | 10/2018 | .......... F24D 19/0092 |
| WO | WO-2013084301 A1 | * | 6/2013 | .......... F24D 11/0214 |
| WO | WO-2019111379 A1 | * | 6/2019 | .......... F24D 11/0214 |

* cited by examiner

Comparative Example

HOT-WATER SUPPLY AND HEATING SYSTEM

CROSS REFERENCE TO RELATED APPLICATION

This application is a U.S. national stage application of PCT/JP2020/045476 filed on Dec. 7, 2020, the contents of which are incorporated herein by reference.

TECHNICAL FIELD

The present disclosure relates to a hot-water supply and heating system provided with a heat source unit that supplies heat to a load-side unit.

BACKGROUND

In the past, hot-water supply systems have been known that include a heat-source-side primary circulation circuit, a load-side secondary circulation circuit, and a heat exchanger connected to the primary circulation circuit and the secondary circulation circuit (for example, see Patent Literature 1). The primary circulation circuit includes a heat source that operates as a heating unit, a first pump that circulates a heat medium in the primary circulation circuit, and a first temperature detection unit that detects the temperature of the heat medium. The secondary circulation circuit includes a heat storage tank that serves as a load-side unit, a second pump that circulates water in the secondary circulation circuit, and a second temperature detection unit that detects the temperature of the water. The heat exchanger causes heat exchange to be performed between the heat medium that is circulated in the primary circulation circuit and the water that flows in the secondary circulation circuit.

In the hot-water supply system disclosed in Patent Literature 1, when the temperature of hot water that is supplied from the secondary circulation circuit to the heat storage tank is lower than a target temperature, the frequency of a compressor of the heat source is increased, or the flow rate of the heat medium in the primary circulation circuit is increased, in order to raise the temperature of the heat medium in the primary circulation circuit. In the hot-water supply system of the Patent Literature 1, in order to reduce lowering of the coefficient of performance of the heat source, the first pump and the second pump are controlled in such a manner as to equalize the flow amount of the heat medium that flows in the primary circulation circuit and that of the hot water that flows in the secondary circulation circuit.

PATENT LITERATURE

Patent Literature 1: International Publication No. 2019/111379

The hot-water supply system disclosed in Patent Literature 1 performs a control to equalize the flow amount of the primary circuit and that of the secondary circulation circuit, even when the heating capacity of the heat source reaches its upper limit, and the temperature of a heat medium in the primary circulation circuit cannot reach the target temperature. Therefore, there is a possibility that a sufficient amount of heat may not be supplied to the secondary circulation circuit.

SUMMARY

The present disclosure is applied to solve the above problem, and relates to a hot-water supply and heating system that can raise the temperature of a fluid in a secondary circuit even when the heating capacity of a primary circuit reaches its limit.

The hot-water supply and heating system according to an embodiment of the present disclosure includes: a heat source unit configured to generate heat; a heat-medium heat exchanger through which the heat is supplied from the heat source unit to a load-side device; a primary circuit in which a first heat medium circulates between the heat source unit and the heat-medium heat exchanger; a first pump provided in the primary circuit and configured to circulate the first heat medium between the heat source unit and the heat-medium heat exchanger; a secondary circuit in which a second heat medium flows between the load-side device and the heat-medium heat exchanger; a second pump provided in the secondary circuit and configured to cause the second heat medium to flow between the load-side device and the heat-medium heat exchanger; a first temperature sensor configured to detect a primary fluid temperature that is a temperature of the first heat medium that flows out of the heat source unit via the primary circuit; a heat-source-unit controller configured to control a heating capacity that is the amount of the heat generated from the heat source unit; and a pump controller configured to control the second pump based on control information received from the heat-source-unit controller. The heat-source-unit controller includes: a primary determination module configured to determine whether the primary fluid temperature detected by the first temperature sensor is lower than a primary target temperature or not; a function determination module configured to determine whether a heating capability of the heat-source-unit device is equal to an upper limit value determined in advance or not, when the primary determination module determines that the primary fluid temperature is lower than the primary target temperature; and a notification module configured to transmit upper-limit reached information as the control information to the pump controller when the function determination module determines that the heating capability of the heat source unit is equal to the upper limit value, the upper-limit reached information being information indicating the heating capacity of the heat source unit reaches the upper limit value. The pump controller includes a pump control module configured to reduce an operation frequency of the second pump when receiving the upper-limit reached information from the heat-source-unit controller.

According to the present disclosure, when the heating capability of the heat source unit reaches the upper limit value, the heat source unit notifies the pump controller that the heating capability of the heat source unit reaches the upper limit value. Thus, the pump controller can control the second pump to reduce the flow rate of a fluid in the secondary circuit, thereby lowering the temperature of the fluid in the secondary circuit.

DETAILED DESCRIPTION

Embodiment 1

Figure 1:
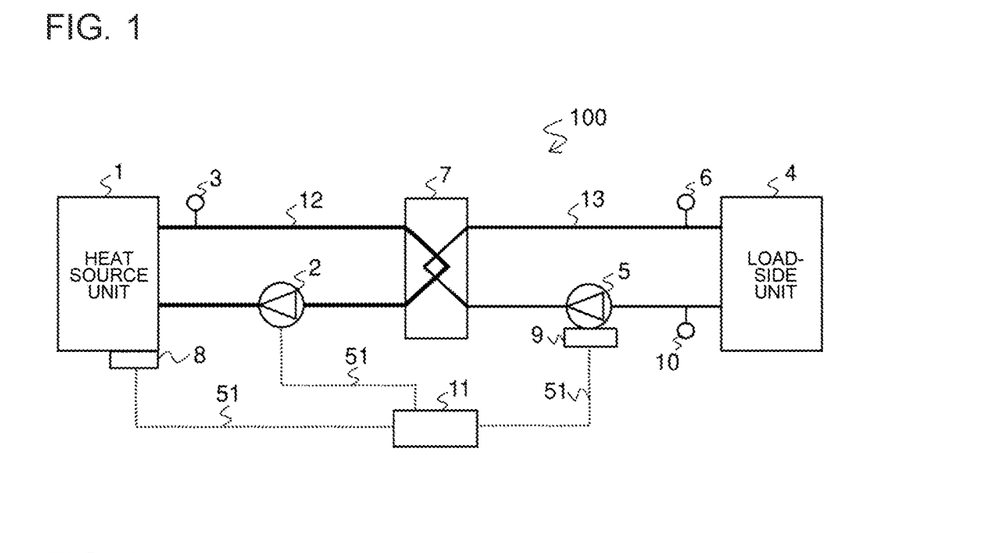
FIG. 1 illustrates a configuration example of a hot-water supply and heating system according to Embodiment 1.

A configuration of a hot-water supply and heating system according to Embodiment 1 will be described. FIG. 1 illustrates a configuration example of the hot-water supply and heating system of Embodiment 1. As illustrated in FIG. 1, a hot-water supply and heating system 100 includes a heat source unit 1, a heat-medium heat exchanger 7, a primary circuit 12 that connects the heat source unit 1 and the heat-medium heat exchanger 7, a secondary circuit 13 that connects the heat-medium heat exchanger 7 and the load-side device 4, and a pump controller 11. The load-side device 4 is, for example, a radiator for heating or a hot-water storage tank.

In the primary circuit 12, a first pump 2 and a first temperature sensor 3 are provided. The first pump 2 circulates a first heat medium in the primary circuit 12, and the first temperature sensor 3 detects a primary fluid temperature Tw1 that is the temperature of a first heat medium that flows out of the heat source unit 1. The following description concerning Embodiment 1 is made with respect to the case where the first heat medium is water. However, the first heat medium may be an antifreeze solution such as brine.

In the secondary circuit 13, a second pump 5, a second temperature sensor 6, and a third temperature sensor 10 are provided. The second pump 5 circulates a second heat medium in the secondary circuit 13, and the second temperature sensor 6 detects the temperature of the second heat medium that flows in the secondary circuit 13. The following description concerning Embodiment 1 is made with respect to the case where the second heat medium is water. The second temperature sensor 6 detects a secondary fluid inlet temperature Tw2in that is the temperature of a second heat medium that flows from the heat-medium heat exchanger 7 into the load-side device 4 via the secondary circuit 13. The third temperature sensor 10 detects a secondary fluid outlet temperature Tw2out that is the temperature of a second heat medium that flows from the load-side device 4 to the secondary circuit 13.

The heat-medium heat exchanger 7 is a device through which heat is supplied from the heat source unit 1 to the load-side device 4. The heat-medium heat exchanger 7 causes heat exchange to be performed between a first heat medium that circulates in the primary circuit 12 and a second heat medium that circulates in the first heat medium. The pump controller 11 is connected to a communication device 8 provided at the heat source unit 1, the first pump 2, and the second pump 5 by signal lines 51. The pump controller 11 is connected to the second temperature sensor 6 and the third temperature sensor 10 by signal lines (not illustrated). The second pump 5 includes an inverter 9 that adjust the operation frequency of a motor (not illustrated). Regarding Embodiment 1, as a matter of convenience for explanation, the inverter 9 and the second pump 5 are illustrated as separate elements.

Figure 2:
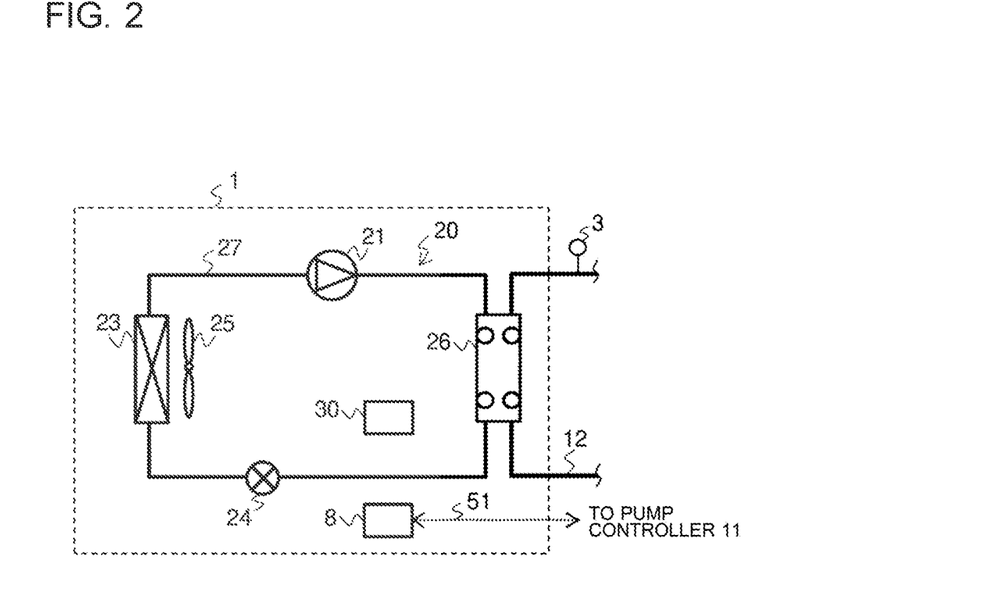
FIG. 2 illustrates a configuration example of a heat source unit as illustrated in FIG. 1.

FIG. 2 illustrates a configuration example of the heat source unit as illustrated in FIG. 1. As illustrated in FIG. 2, the heat source unit 1 includes a compressor 21, a heat-source-side heat exchanger 23, an expansion valve 24, a fan 25, a load-side heat exchanger 26, a heat-source-unit controller 30, and a communication device 8. The compressor 21, the heat-source-side heat exchanger 23, the expansion valve 24, and the load-side heat exchanger 26 are connected by refrigerant pipes 27, whereby a refrigerant circuit 20 is formed. The heat-source-unit controller 30 is connected to the compressor 21, the expansion valve 24, the communication device 8, and the first temperature sensor 3 by signal lines (not illustrated).

The compressor 21 sucks refrigerant from the refrigerant pipe 27, compresses the sucked refrigerant, and then discharges the compressed refrigerant to the refrigerant pipe 27. The compressor 21 is, for example, an inverter compressor whose capacity is changed by changing an operation frequency Fc. The load-side heat exchanger 26 is a heat exchanger that operations as a condenser. At the load-side heat exchanger 26, the refrigerant discharged from the compressor 21 exchanges heat with the first heat medium that circulates in the primary circuit 12. The expansion valve 24 expands refrigerant that flows thereinto from the load-side heat exchanger 26 by reducing the pressure of the refrigerant. The expansion valve 24 is, for example, an electric expansion valve that can adjust the flow rate of the refrigerant. When being rotated, the fan 25 supplies air to the heat-source-side heat exchanger 23. The fan 25 is, for example, a propeller fan. The heat-source-side heat exchanger 23 is a heat exchanger that operates as an evaporator. At the heat-source-side heat exchanger 23, low-temperature and low-pressure refrigerant that flows out of the expansion valve 24 exchanges heat with the air supplied from the fan 25.

Figure 4:
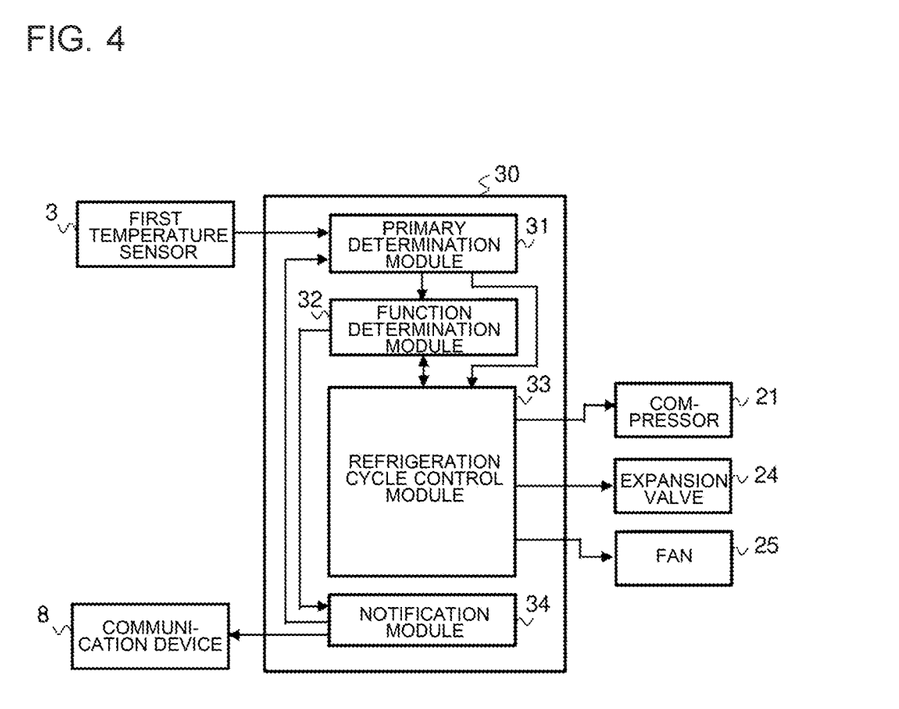
FIG. 4 is a function block diagram illustrating a configuration example of a heat-source-unit controller as illustrated in FIG. 2.

Next, a configuration of the heat-source-unit controller 30 as illustrated in FIG. 2 will be described. FIG. 4 is a function block diagram illustrating a configuration example of the heat-source-unit controller as illustrated in FIG. 2. The heat-source-unit controller 30 is a controller that controls a heating capacity that is the amount of heat generated by the heat source unit 1. The heat-source-unit controller 30 is, for example, a microcomputer. The heat-source-unit controller 30 includes a primary determination module 31, a function determination module 32, a refrigeration cycle control module 33, and a notification module 34.

The primary determination module 31 determines whether the primary fluid temperature Tw1 detected by the first temperature sensor 3 is lower than a primary target temperature Tw1s or not, and transmits the result of this determination to the function determination module 32 and the refrigeration cycle control module 33. When the primary determination module 31 determines that the primary fluid temperature Tw1 is lower than the primary target temperature Tw1s, the function determination module 32 determines whether the heating capability of the heat source unit 1 is equal to an upper limit value determined in advance or not, and transmits the result of this determination to the notification module 34. For example, the function determination module 32 acquires from the refrigeration cycle control module 33, information on the operation frequency Fc of the compressor 21, and determines whether the operation frequency Fc is equal to the highest frequency Fmax or not, thereby determining whether the heating capacity of the heat source unit 1 is equal to the upper limit value or not.

The refrigeration cycle control module 33 acquires the primary fluid temperature Tw1 detected by the first temperature sensor 3 via the primary determination module 31 and the function determination module 32. Then, the refrigeration cycle control module 33 controls the opening degree of the expansion valve 24 and the operation frequency Fc of the compressor 21 such that the primary fluid temperature Tw1 coincides with the primary target temperature Tw1s within a predetermined range. The refrigeration cycle control module 33 raises the heating capacity of the heat source unit 1, when the primary fluid temperature Tw1 is lower than the primary target temperature Tw1s and the function determination module 32 determines that the heating capacity of the heat source unit 1 is less than the upper limit value. To be more specific, the refrigeration cycle control module 33 increases the operation frequency Fc of the compressor 21 to a higher value than a currently set value.

When the function determination module 32 determines that the heating capacity of the heat source unit 1 is equal to the upper limit value, the notification module 34 transmits as control information, upper-limit reached information indicating that the heating capacity of the heat source unit 1 reaches the upper limit value, to the pump controller 11 via the communication device 8. Furthermore, the notification module 34 may be set in advance regarding whether or not to transmit the upper-limit reached information to the pump controller 11 when the heating capacity of the heat source unit 1 reaches the upper limit value. For example, as setting patterns of the above setting, two kinds of setting patterns are conceivable. In the following, as examples of the setting patterns, pattern 1 and pattern 2 are described.

The pattern 1 is a pattern in which the notification module 34 can be set depending on whether or not a confirmation instruction is given with respect to whether or not to transmit the upper-limit reached information to the pump controller 11 when the heating capacity of the heat source unit 1 reaches the upper limit value. In the case where the pattern 1 is set and the confirmation instruction is given, the notification module 34 transmits the upper-limit reached information to the pump controller 11 when the heating capacity of the heat source unit 1 reaches the upper limit value. In the case where the pattern 1 is set, but the confirmation instruction is not given, the notification module 34 does not transmit the upper-limit reached information to the pump controller 11 even when the heating capacity of the heat source unit 1 reaches the upper limit value.

The pattern 2 is a pattern in which the notification module 34 transmits the upper-limit reached information to the pump controller 11 whenever the heating capacity of the heat source unit 1 reaches the upper limit value. In the notification module 34, either the pattern 1 or the pattern 2 is set in advance by a user or an installer who installs the hot-water supply and heating system 100. In the case where the pattern 1 is set in the notification module 34, whether the confirmation instruction is given or not is also set in the notification module 34 by the user or the installer of the hot-water supply and heating system 100.

Figure 3:
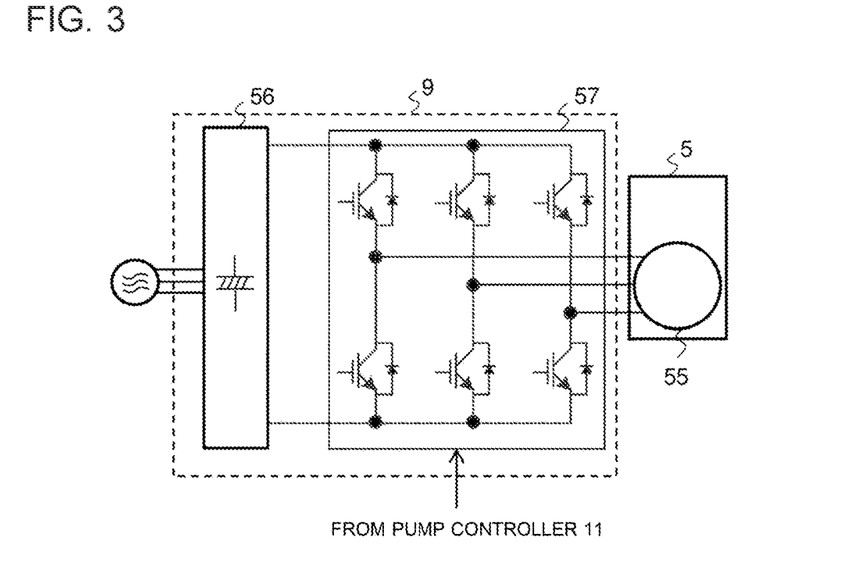
FIG. 3 illustrates a configuration example of an inverter as illustrated in FIG. 1.

FIG. 3 illustrates a configuration example of the inverter as illustrated in FIG. 1. The inverter 9 includes a power conversion circuit 56 and an inverter circuit 57. The power conversion circuit 56 converts an AC voltage applied from an AC power supply into a DC voltage, and the inverter circuit 57 converts the DC voltage into a three-phase AC and supplies power to a motor 55 of the second pump 5. The inverter circuit 57 includes, for example, six transistor elements. The transistor elements are each turned on or off in response to an operation signal input thereto from the pump controller 11.

Figure 5:
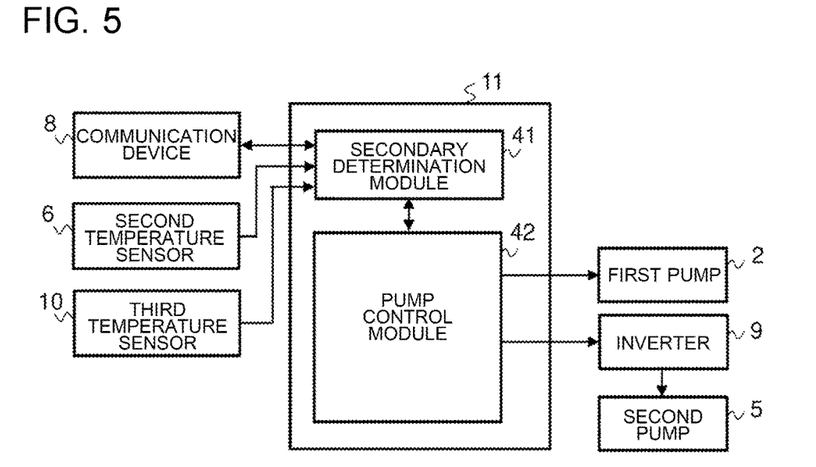
FIG. 5 is a function block diagram illustrating a configuration example of a pump controller as illustrated in FIG. 1.

Next, a configuration of a configuration of the pump controller 11 as illustrated in FIG. 1 will be described. FIG. 5 is a function block diagram illustrating a configuration example of the pump controller as illustrated in FIG. 1. The pump controller 11 is a controller that controls the first pump 2 and the second pump 5 based on control information received from the heat-source-unit controller 30. The pump controller 11 is, for example, a microcomputer. The pump controller 11 includes a secondary determination module 41 and a pump control module 42.

When receiving the upper-limit reached information from the heat-source-unit controller 30, the secondary determination module 41 determines whether a heat load that occurs at the load-side device 4 is low or not based on the secondary fluid inlet temperature Tw2in, and transmits the result of this determination to the pump control module 42. For example, the secondary determination module 41 calculates a temperature difference $\Delta Tw2d$ between the secondary fluid inlet temperature Tw2in and a secondary target temperature Tw2s, and determines that the heat load is low when the temperature difference $\Delta Tw2d$ is less than or equal to a first threshold Th1. The secondary target temperature Tw2s is set by a user who uses the load-side device 4.

Furthermore, the secondary determination module 41 may determine whether the heat load is low or not in the following manner. The secondary determination module 41 calculates a temperature difference $\Delta Tw2$ between the secondary fluid inlet temperature Tw2in and the secondary fluid outlet temperature Tw2out. Then, the secondary determination module 41 determines that the heat load is low, when the temperature difference $\Delta Tw2d$ is less than or equal to a second threshold Tth2 determined in advance.

The pump control module 42 controls starting and stopping of the first pump 2 and the second pump 5. Furthermore, the pump control module 42 decreases the operation frequency of the second pump 5 when the secondary determination module 41 determines that the heat load of the load-side device 4 is low. To be more specific, the pump control module 42 transmits to the inverter circuit 57, an operation signal for reducing current that is supplied to the motor 55 which is provided as illustrated in FIG. 3.

Examples of hardware of the heat-source-unit controller 30 as illustrated in FIG. 4 and hardware of the pump controller 11 as illustrated in FIG. 5 will be described. In the following, an example of a hardware configuration of the heat-source-unit controller 30 as illustrated in FIG. 4 is described, but a detailed description of a hardware configuration of the pump controller 11 is omitted, because the hardware configuration of the pump controller 11 is similar to that of the heat-source-unit controller 30.

Figure 6:
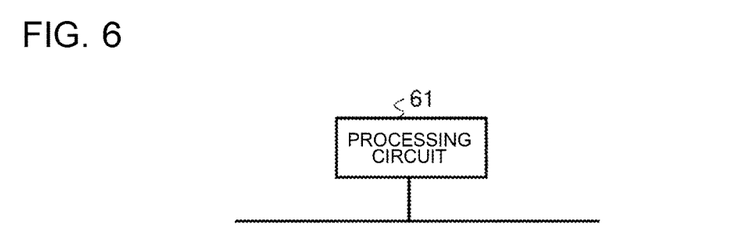
FIG. 6 is a hardware configuration diagram illustrating a configuration example of a heat-source-unit controller as illustrated in FIG. 4.

FIG. 6 is a hardware configuration diagram illustrating a configuration example of the heat-source-unit controller as illustrated in FIG. 4. In the case where various functions of the heat-source-unit controller 30 are fulfilled by hardware, the heat-source-unit controller 30 as illustrated in FIG. 4 is a processing circuit 61 as illustrated in FIG. 6. The primary determination module 31, the function determination module 32, the refrigeration cycle control module 33, and the notification module 34, which are all illustrated in FIG. 4, form the processing circuit 61.

In the case where the various functions are fulfilled by hardware, the processing circuit 61 is, for example, a single-component circuit, a composite circuit, a programmed processor, a processor that parallelly processes a program, an application specific integrated circuit (ASIC), a field-programmable gate array (FPGA) or a combination of these circuits and processors. The functions of the primary determination module 31, the function determination module 32, the refrigeration cycle control module 33 and the notification module 34 may be fulfilled by respective processing circuits 61 or a single processing circuit 61.

Figure 7:
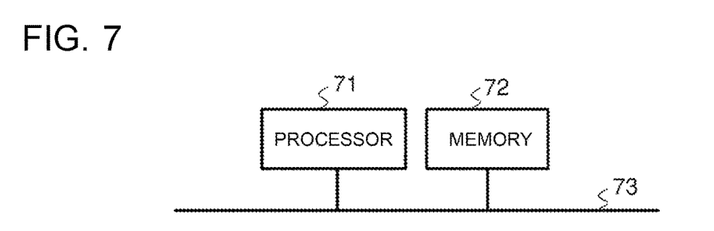
FIG. 7 is a hardware configuration diagram illustrating another configuration example of the heat-source-unit controller as illustrated in FIG. 4.

Furthermore, an example of another hardware of the heat-source-unit as illustrated in FIG. 4 will be described. FIG. 7 is a hardware configuration diagram illustrating another configuration example of the heat-source-unit controller as illustrated in FIG. 4. In the case where the functions of the heat-source-unit controller 30 are fulfilled by software, as illustrated in FIG. 7, the heat-source-unit controller 30 includes a processor 71 such as a central processing unit (CPU) and a memory 72. The functions of the primary determination module 31, the function determination module 32, the refrigeration cycle control module 33, and the notification module 34 are fulfilled by the processor 71 and the memory 72. The processor 71 and the memory 72 are connected to each other by a bus 73.

In the case where the functions are fulfilled by software, the functions of the primary determination module 31, the function determination module 32, the refrigeration cycle control module 33, and the notification module 34 are fulfilled by software, firmware, or a combination of software and firmware. The software and the firmware are written as programs and stored in the memory 72. The processor 71 fulfills the functions of the above modules by reading out programs stored in the memory 72 and executing the programs.

As the memory 72, for example, a nonvolatile semiconductor memory such as a read-only memory (ROM), a flash memory, an erasable and programmable ROM (EPROM), or an electrically erasable and programmable ROM (EEPROM) is used. Alternatively, as the memory 72, a volatile semiconductor memory such as a random access memory (RAM) may be used, or a removable record medium such as a magnetic disc, a flexible disc, an optical disc, a compact disc (CD), a MiniDisc (MD) or a digital versatile disc (DVD) may be used.

It should be noted that a hardware configuration of the pump controller 11 may be the configuration described with reference to FIG. 6 or the configuration described with reference to FIG. 7. Furthermore, regarding connection of the pump controller 11, the above description concerning Embodiment 1 is made with respect to the case where the pump controller 11 is connected to the communication device 8, the first pump 2, the second pump 5, the second temperature sensor 6, and the third temperature sensor 10 by signal lines. This connection, however, is not limited to connection using the signal lines, that is, it may be wireless connection. Also, regarding the connection of the heat-source-unit controller 30, the description is made with respect to the case where the heat-source-unit controller 30 is connected to the compressor 21, the expansion valve 24, the communication device 8, and the first temperature sensor 3 by signal lines. This connection, however, is not limited to connection using the signal lines, that is, it may be wireless connection.

Furthermore, communication between the pump controller 11 and the communication device 8 may be performed according to a communication protocol or a communication standard determined in advance, or performed by transmission of an ON signal or an OFF signal from the communication device 8 to the pump controller 11. The communication protocol is, for example, Modbus (trademark). In the case where the communication is wireless communication, the communication standard is, for example, Wi-Fi (trademark). In the case where the communication is performed by transmission of an ON signal or an OFF signal, a voltage that is higher than or equal to a threshold voltage corresponding to a reference voltage is the ON voltage, and a voltage that is lower than the threshold voltage is the OFF voltage. When the heating capability of the heat source unit 1 reaches the upper limit value, the notification module 34 transmits the ON signal to the pump controller 11 via the communication device 8, and when the heating capability of the heat source unit 1 is less than the upper limit value, the notification module 34 does not change, from the OFF signal, the signal that is to be transmitted to the pump controller 11 via the communication device 8.

Figure 8:
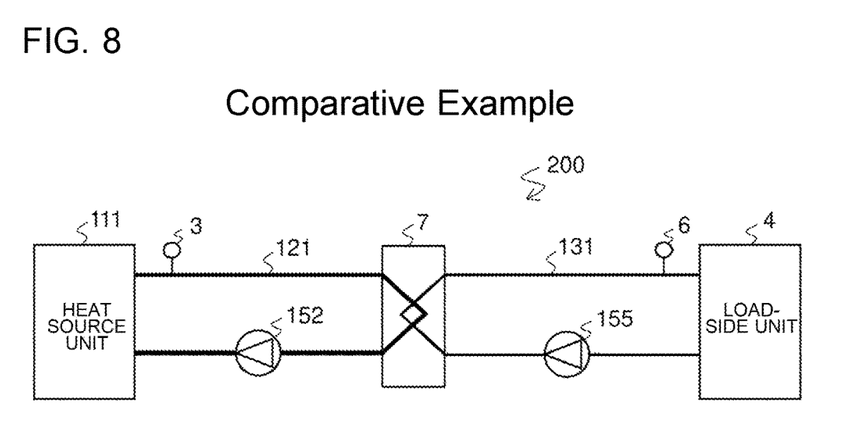
FIG. 8 illustrates a configuration example of a hot-water supply and heating system of a comparative example.

Next, before an operation of the hot-water supply and heating system 100 according to Embodiment 1 will be described, a hot-water supply and heating system of a comparative example will be described. FIG. 8 illustrates a configuration example of the hot-water supply and heating system of the comparative example. A hot-water supply and heating system 200 includes a heat source unit 111, a primary circuit 121, and a secondary circuit 131. In the primary circuit 121, a first pump 152 is provided, and in the secondary circuit 131, a second pump 155 is provided. The hot-water supply and heating system 200 is not able to adjust the operation frequency of the second pump 155. The following description concerning the comparative example is made with respect to the case where the fluid in the primary circuit 121 and that in the secondary circuit 131 are water.

The target temperature for the secondary circuit 131 is determined based on a heating load generated at the load-side device 4. Heating for raising the temperature of water that flows in the secondary circuit 131 to the target temperature is performed by heat exchange that is caused by the heat-medium heat exchanger 7 to be performed between water that circulates in the primary circuit 121 and water that circulates in the secondary circuit 131. When the temperature of the water in the secondary circuit 131 does not reach the target temperature, a heat-source-unit controller (not illustrated) raises the target temperature for the primary circuit 121, and a heating unit in the primary circuit 121 adjusts a temperature. In the hot-water supply and heating system 200, when the target temperature for the secondary circuit 131 is raised, temperature adjustment is performed within the range of the heating capability of a heat source unit 111 in the primary circuit 121.

In general, a relationship between a heat quantity, the flow rate of a fluid, and the temperature of the fluid satisfies the following equation (1):

$$Q = Gw \times Cp + \Delta Tw \qquad (1)$$

In the equation (1), Q is the heat quantity [kw], Gw is the flow rate [t/h], Cp is the specific heat [kj/kg] of water, and $\Delta Tw$ is a temperature difference [° C.] (outlet water temperature To−inlet water temperature Ti) of water.

In the equation (1), the left side is related to the primary circuit 121, and the right side is related to the secondary circuit 131. When the heating capability of the heat source unit 111 in the primary circuit 121 reaches its limit, the heat quantity Q on the left side is constant, and the specific heat CP on the right side is invariable since the specific heat CP is a physical property. In this case, by decreasing the flow rate Gw in the secondary circuit 131, the temperature difference ΔTw is increased. That is, in order that the water temperature in the secondary circuit 131 be raised, it suffices to decrease the flow rate Gw in the secondary circuit 131. However, since the hot-water supply and heating system 200 is not able to adjust the operation frequency of the second pump 155, the flow rate in the secondary circuit 131 cannot be controlled, and is thus constant.

Figure 9:
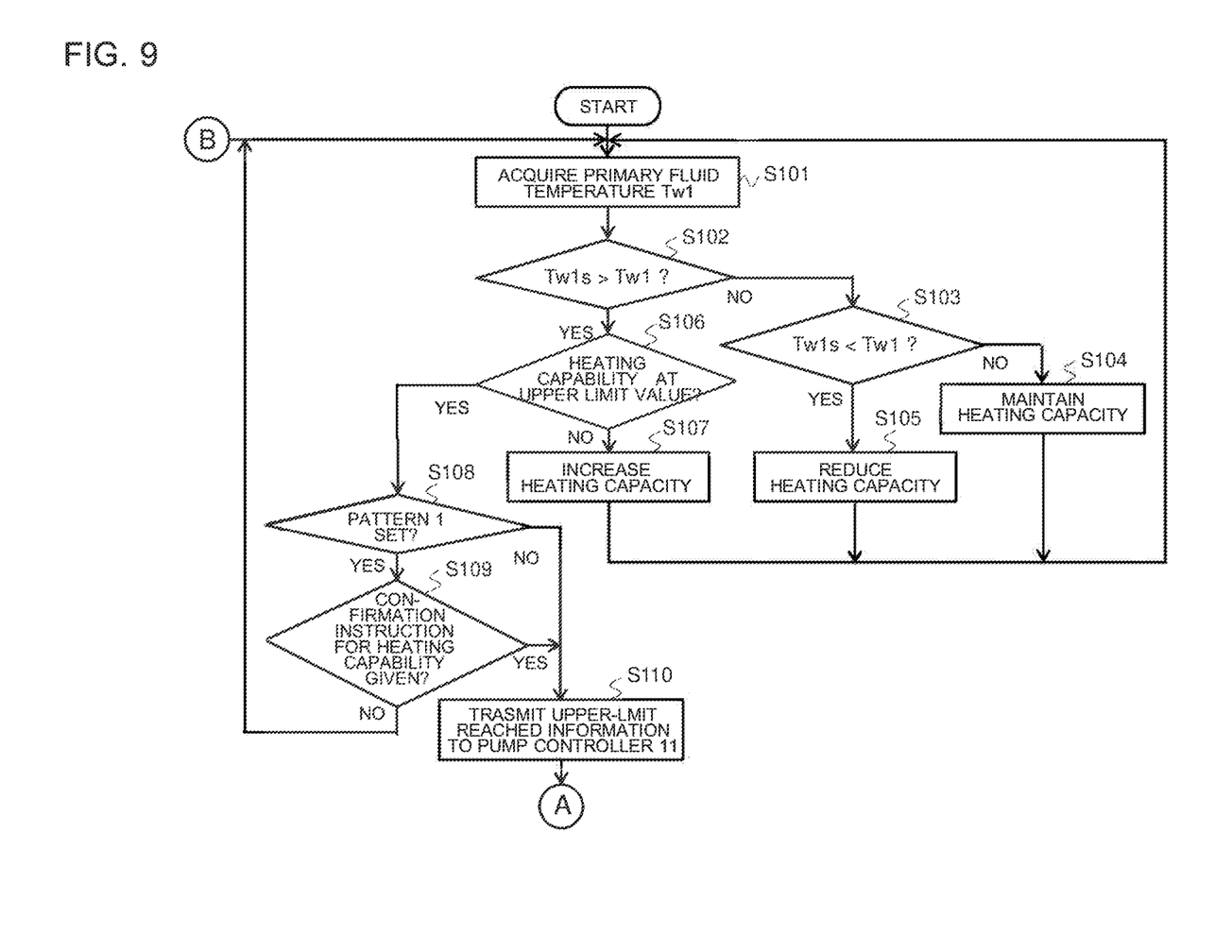
FIG. 9 is a flow chart of the procedure of an operation in the hot-water supply and heating system according to Embodiment 1.
Figure 10:
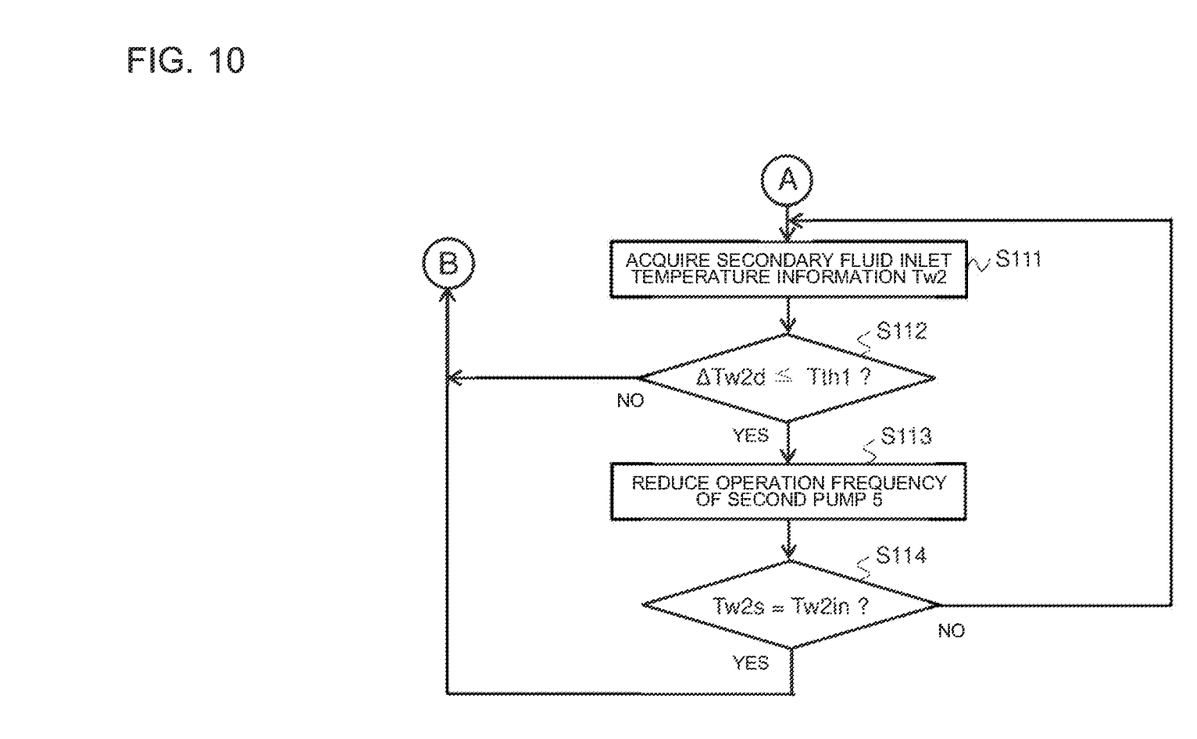
FIG. 10 is a flow chart of the procedure of another operation in the hot-water supply and heating system according to Embodiment 1.

Operations of the hot-water supply and heating system 100 according to Embodiment 1 will be described. FIGS. 9 and 10 are flow charts of the procedures of operations of the hot-water supply and heating system according to Embodiment 1. To be more specific, FIG. 9 indicates processing that is executed by the heat-source-unit controller 30, and FIG. 10 indicates processing that is performed by the pump controller 11.

The primary determination module 31 acquires information on the primary fluid temperature Tw1 from the first temperature sensor 3 at predetermined time intervals (step S101). The primary determination module 31 determines whether the primary fluid temperature Tw1 is lower than the primary target temperature Tw1s or not (step S102). When the result of the determination in step S102 is no, the primary determination module 31 determines whether the primary fluid temperature Tw1 is higher than the primary target temperature Tw1s or not (step S103).

When it is determined in step S103 that the primary fluid temperature Tw1 is equal to the primary target temperature Tw1s, the refrigeration cycle control module 33 maintains a heating capacity (step S104). When it is determined in step S103 that the primary fluid temperature Tw1 is higher than the primary target temperature Tw1s, the refrigeration cycle control module 33 reduces the heating capacity (step S105).

By contrast, when it is determined in step S102 that the primary fluid temperature Tw1 is lower than the primary target temperature Tw1s, the function determination module 32 determines whether the heating capability is equal to the upper limit value or not (step S106). When the heating capability is less than the upper limit value, the refrigeration cycle control module 33 increases the heating capacity (step S107). When it is determined in step S106 that the heating capability is equal to the upper limit value, the notification module 34 determines whether the pattern 1 is set or not (step S108).

When it is determined in step 108 that the pattern 1 is set, the notification module 34 determines whether the confirmation instruction for the heating capability is given or not (step S109). When the confirmation instruction for the heating capability is given, the notification module 34 transmits the upper-limit reached information to the pump controller 11 (step S110). When it is determined in step S109 that the confirmation instruction for the heating capability is not given, the notification module 34 instructs the primary determination module 31 to execute a determination process of step S101. By contrast, when it is determined in step S108 that the pattern 1 is not set, it means that the pattern 2 is set, and the notification module 34 thus transmits the upper-limit reached information to the pump controller 11 (step S110).

When receiving the upper-limit reached information from the heat-source-unit controller 30, as indicated in FIG. 10, the secondary determination module 41 of the pump controller 11 acquires the secondary fluid inlet temperature Tw2in from the second temperature sensor 6 (step S111).

The secondary determination module 41 determines whether a heating load generated at the load-side device 4 is low or not based on the secondary fluid inlet temperature Tw2in. To be more specific, the secondary determination module 41 calculates the temperature difference ΔTw2d between the secondary fluid inlet temperature Tw2in and the secondary target temperature Tw2s. Then, the secondary determination module 41 determines whether the temperature difference ΔTw2d is less than or equal to the first threshold Tth1 determined in advance or not (step S112).

When it is determined in step S112 that the temperature difference ΔTw2d is greater than the first threshold Tth1, the secondary determination module 41 instructs the primary determination module 31 of the heat-source-unit controller 30 to execute the determination process of S101. When it is determined in step S112 that the temperature difference ΔTw2d is less than or equal to the first threshold Tth1, the pump control module 42 controls the inverter 9 to reduce the operation frequency of the second pump 5 (step S113). Thereafter, the secondary determination module 41 determines whether the secondary fluid inlet temperature Tw2in is equal to the secondary target temperature Tw2s or not (step S114). When the secondary fluid inlet temperature Tw2in is not equal to the secondary target temperature Tw2s, the processing by the secondary determination module 41 is returned to the process of step S111. By contrast, when it is determined in step S114 that the secondary fluid inlet temperature Tw2in is equal to the secondary target temperature Tw2s, the secondary determination module 41 instructs the primary determination module 31 of the heat-source-unit controller 30 to execute the determination process of step S101.

According to Embodiment 1, as described with reference to FIGS. 9 and 10, the pump controller 11 can confirm whether the capability of the heat source unit 1 which is the heating unit of the primary circuit 12 reaches its limit or not. Then, when the capability of the heat source unit 1 reaches the value, but the temperature of the fluid in the secondary circuit 13 does not reach the target temperature, the pump controller 11 can adjust the flow rate of the fluid in the secondary circuit 13 to cause the temperature of the fluid in the secondary circuit 13 to reach the target temperature. In this case, the heat load at the load-side device 4 is low. It is therefore possible to raise the temperature of the fluid in the secondary circuit 13 to the secondary target temperature Tw2s, without causing the user to notice a change in the flow rate in the secondary circuit 13.

It should be noted that although it is described above that in steps S111 and S112 as indicated in FIG. 10, the secondary determination module 41 makes a determination by comparing the temperature difference ΔTw2d between the secondary fluid inlet temperature Tw2in and the secondary target temperature Tw2s with the first threshold Tth1, this is not limiting. The secondary determination module 41 may determine whether the heat load at the load-side device 4 is low or not by comparing the temperature difference ΔTw2d between the secondary fluid inlet temperature Tw2in and the secondary fluid outlet temperature Tw2out with the second threshold Tth2.

Furthermore, although it is described above with reference to FIG. 10 that when the secondary determination module 41 determines that the head load at the load-side device 4 is low, the flow rate in the secondary circuit 13 is reduced, this is not limiting. When receiving the upper-limit reached information from the heat-source-unit controller 30 via the secondary determination module 41, the pump control module 42 may reduce the operation frequency of the second pump 5 regardless of what determination is made by the secondary determination module 41. This is because even in the case where the flow rate in the secondary circuit 13 is reduced, if the flow rate is not greatly changed, the user may not notice the change in the flow rate.

Figure 11:
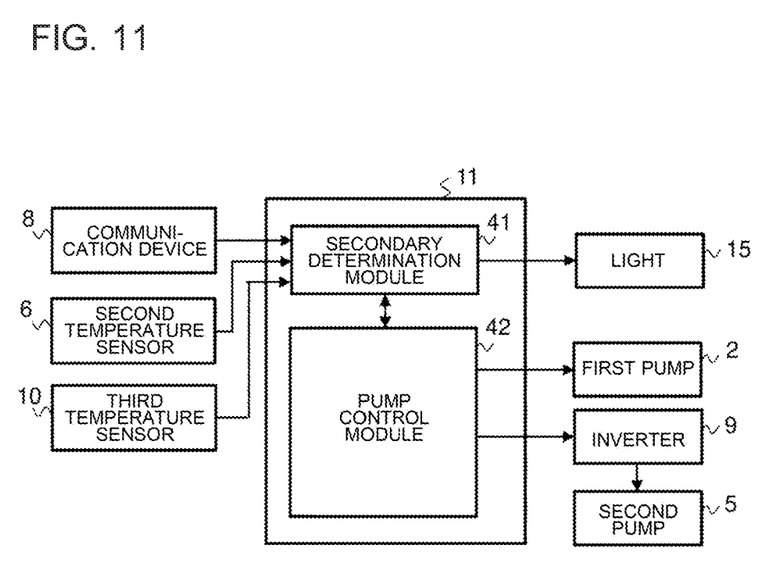
FIG. 11 is a block diagram for explanation of another example of a control that is performed by the pump controller as illustrated in FIG. 1.

By contrast, in the case where the user notices that the flow rate in the secondary circuit 13 is reduced, it is conceivable that the user suspects that a failure occurs in the load-side device 4. Therefore, the pump controller 11 may notice the user that the heat capacity of the heat source unit 1 reaches the upper limit value. FIG. 11 is a block diagram for explanation of another example of the control by the pump controller as illustrated in FIG. 1.

As illustrated in FIG. 11, a light 15 such as a light emitting diode (LED) is connected to the pump controller 11. The light 15 is provided at a position which can be visually recognized by the user who uses the load-side device 4. For example, in the case where the load-side device 4 is a radiator for heating, the light 15 is provided at the load-side device 4.

In the case where the temperature of a fluid for use in the load-side device 4 does not rise to the target temperature, the user will try to change the set temperature to a higher value than a currently set value. However, when the light 15 is lit, the user can recognize that the heating capacity of the heat source unit 1 reaches the upper limit value. Thus, it is possible to prevent the user from unreasonably raising the secondary target temperature Tw2s of the secondary circuit 13.

The hot-water supply and heating system 100 according to Embodiment 1 includes the heat source unit 1 which generates heat, the heat-medium heat exchanger 7 through which heat is supplied from the heat source unit 1 to the load-side device 4, the primary circuit 12, the secondary circuit 13, the heat-source-unit controller 30, and the pump controller 11. The primary circuit 12 is a circuit in which the first heat medium is circulated between the heat source unit 1 and the heat-medium heat exchanger 7. In the primary circuit 12, the first pump 2 and the first temperature sensor 3 are provided. The first pump causes the first heat medium to circulate between the heat source unit 1 and the heat-medium heat exchanger 7. The first temperature sensor 3 detects the primary fluid temperature Tw1 which is the temperature of the first heat medium that flows out of the heat source unit 1. The secondary circuit 13 is a circuit in which the second heat medium flows between the load-side device 4 and the heat-medium heat exchanger 7. In the secondary circuit 13, the second pump 5 is provided. The second pump 5 causes the second heat medium to flow between the load-side device 4 and the heat-medium heat exchanger 7. The heat-source-unit controller 30 is a controller that controls the heating capacity which is the amount of heat generated at the heat source unit 1, and includes the primary determination module 31, the function determination module 32, and the notification module 34. The primary determination module 31 determines whether the primary fluid temperature Tw1 detected by the first temperature sensor 3 is lower than the primary target temperature Tw1s or not. When it is determined that the primary fluid temperature Tw1 is lower than the primary target temperature Tw1s, the primary determination module 31 determines whether the heating capacity of the heat source unit 1 is equal to the upper limit value determined in advance or not. When the function determination module 32 determines that the heating capacity of the heat source unit 1 is equal to the upper vale, the notification module 34 transmits the upper-limit reached information as control information to the pump controller 11. The upper limit-reached information is information indicating that the heating capacity of the heat source unit 1 reaches the upper limit value. The pump controller 11 controls the second pump 5 based on the control information received from the heat-source-unit controller 30. The pump controller 11 includes the pump control module 42 that reduces the operation frequency of the second pump 5 when receiving the upper-limit reached information from the heat-source-unit controller 30.

In Embodiment 1, when the heating capacity of the heat source unit 1 reaches the upper limit value, information indicating that the heating capacity of the heat source unit 1 reaches the upper limit value is transmitted from the heat source unit 1 to the pump controller 11. Thus, the pump controller 11 can confirm that the heating capacity of the primary circuit 12 reaches the limit. As a result, the pump controller 11 can raise the temperature of the fluid in the secondary circuit 13 by controlling the second pump 5 to reduce the flow rate of the fluid in the secondary circuit 13.

Furthermore, in Embodiment 1, the pump controller 11 determines whether the heat load that occurs at the load-side device is low or not, and may perform a control to reduce the operation frequency of the second pump 5 when the heat load is low. In this case, even if the flow rate of the fluid in the secondary circuit 13 is decreased, since the heat load at the load-side device 4 is low, it is possible to raise the temperature of the fluid in the secondary circuit 13 to the secondary target temperature Tw2s, without causing the user to notice a change in the flow rate of the fluid in the secondary circuit 13.

It should be noted that although regarding Embodiment 1, it is described above that the communication device 8 is provided at the heat source unit 1, it is not indispensable that the communication device 8 is provided. For example, in the case where the communication standard of the heat-source-unit controller 30 is the same as that of the pump controller 11, the communication device 8 may not be provided. Furthermore, Embodiment 1 can be applied to an existing hot-water supply and heating that does not include the pump controller 11. For example, Embodiment 1 can also be applied to the hot-water supply and heating system of the comparison example which is provided as illustrated in FIG. 8.

The invention claimed is:

1. A hot-water supply and heating system comprising:
   a heat source unit configured to generate heat;
   a heat-medium heat exchanger through which the heat is supplied from the heat source unit to a load-side device;
   a primary circuit in which a first heat medium circulates between the heat source unit and the heat-medium heat exchanger;
   a first pump provided in the primary circuit and configured to circulate the first heat medium between the heat source unit and the heat-medium heat exchanger;
   a secondary circuit in which a second heat medium flows between the load-side device and the heat-medium heat exchanger;
   a second pump provided in the secondary circuit and configured to cause the second heat medium to flow between the load-side device and the heat-medium heat exchanger;
   a first temperature sensor configured to detect a primary fluid temperature that is a temperature of the first heat medium that flows out of the heat source unit via the primary circuit;
   a second temperature sensor configured to detect a secondary fluid inlet temperature that is a temperature of the second heat medium that flows from the heat-medium heat exchanger into the load-side device via the secondary circuit;
a heat-source-unit controller configured to control a heating capacity that is the amount of the heat generated from the heat source unit; and
a pump controller configured to control the second pump based on control information received from the heat-source-unit controller,
wherein the heat-source-unit controller is configured to:
    determine whether the primary fluid temperature detected by the first temperature sensor is lower than a primary target temperature or not;
    determine whether a heating capability of the heat-source-unit device is equal to an upper limit value determined in advance or not, when determining that the primary fluid temperature is lower than the primary target temperature; and
    transmit upper-limit reached information as the control information to the pump controller when determining that the heating capability of the heat source unit is equal to the upper limit value, the upper-limit reached information being information indicating the heating capacity of the heat source unit reaches the upper limit value, and
wherein the pump controller is configured to:
    reduce an operation frequency of the second pump when receiving the upper-limit reached information from the heat-source-unit controller;
    determine whether a heat load that occurs at the load-side device is low or not based on the secondary fluid inlet temperature, when receiving the upper-limit reached information from the heat-source-unit controller; and
    reduce an operation frequency of the second pump when determining that the heat load is low.

2. The hot-water supply and heating system of claim 1, wherein the pump controller is configured to determine that the heat load is low when a temperature difference between the secondary fluid inlet temperature and a secondary target temperature is smaller than or equal to a first threshold determined in advance.

3. The hot-water supply and heating system of claim 1, further comprising:
    a third temperature sensor configured to detect a secondary fluid outlet temperature that is a temperature of the second heat medium that flows from the load-side device to the secondary circuit,
    wherein the pump controller is configured to determine that the heat load is low when a temperature difference between the secondary fluid inlet temperature and the secondary fluid outlet temperature is smaller than or equal to a second threshold determined in advance.

4. The hot-water supply and heating system of claim 1, further comprising:
    a light connected to the pump controller,
    wherein the pump controller is configured to light the light when receiving the upper-limit reached information from the heat-source-unit controller.

* * * * *